Nov. 12, 1957     F. G. TURPIN     2,813,140
CONTROL OF TEMPERATURE GRADIENT IN TRANSFER LINE REACTOR
Filed July 14, 1954     2 Sheets-Sheet 1
FIG. I
EXAMPLE OF CONTROLLING TEMPERATURE GRADIENT IN A TRANSFER-LINE REACTOR BY CHANGING PARTICLE SIZE OF THE CIRCULATING SOLIDS
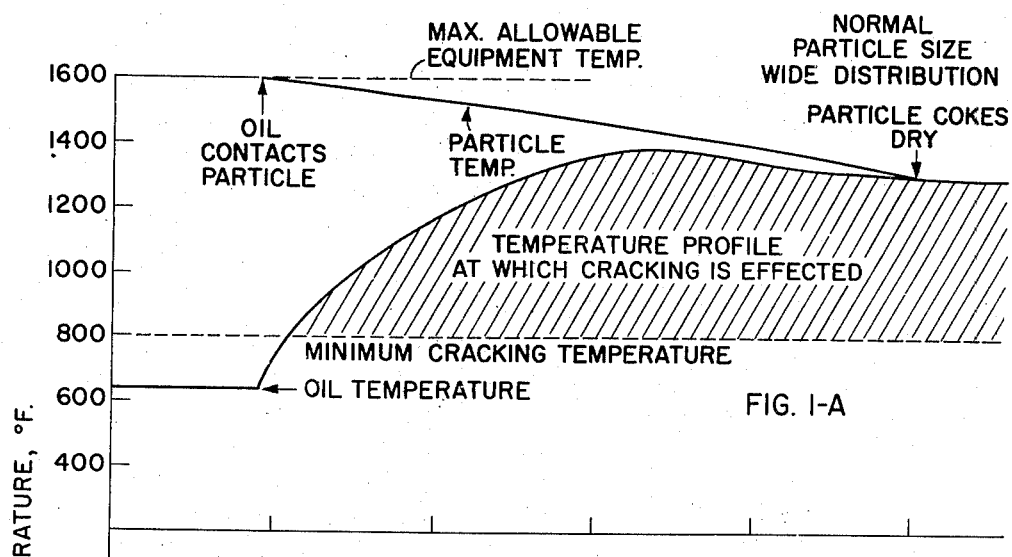
FIG. I-A
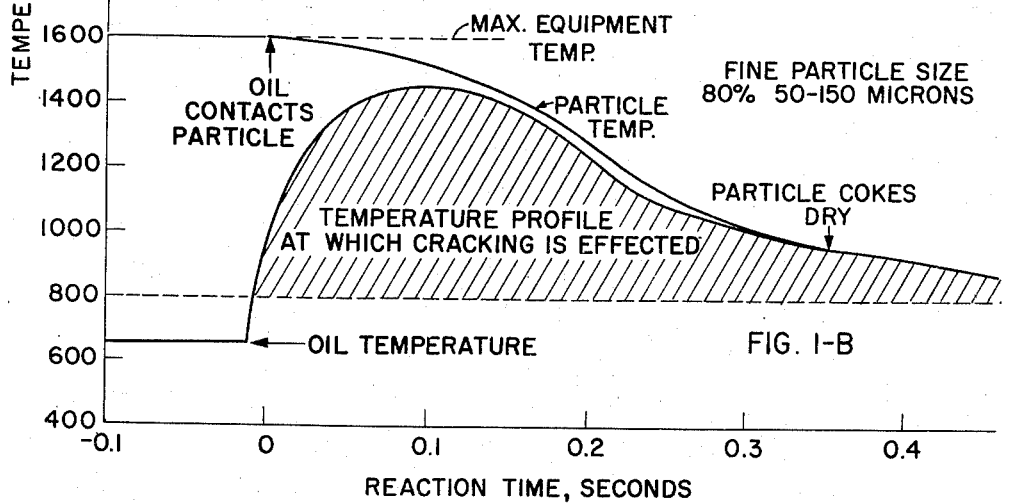
FIG. I-B
FRANK G. TURPIN *INVENTOR.*
BY *L. C. Hasan*
*ATTORNEY*

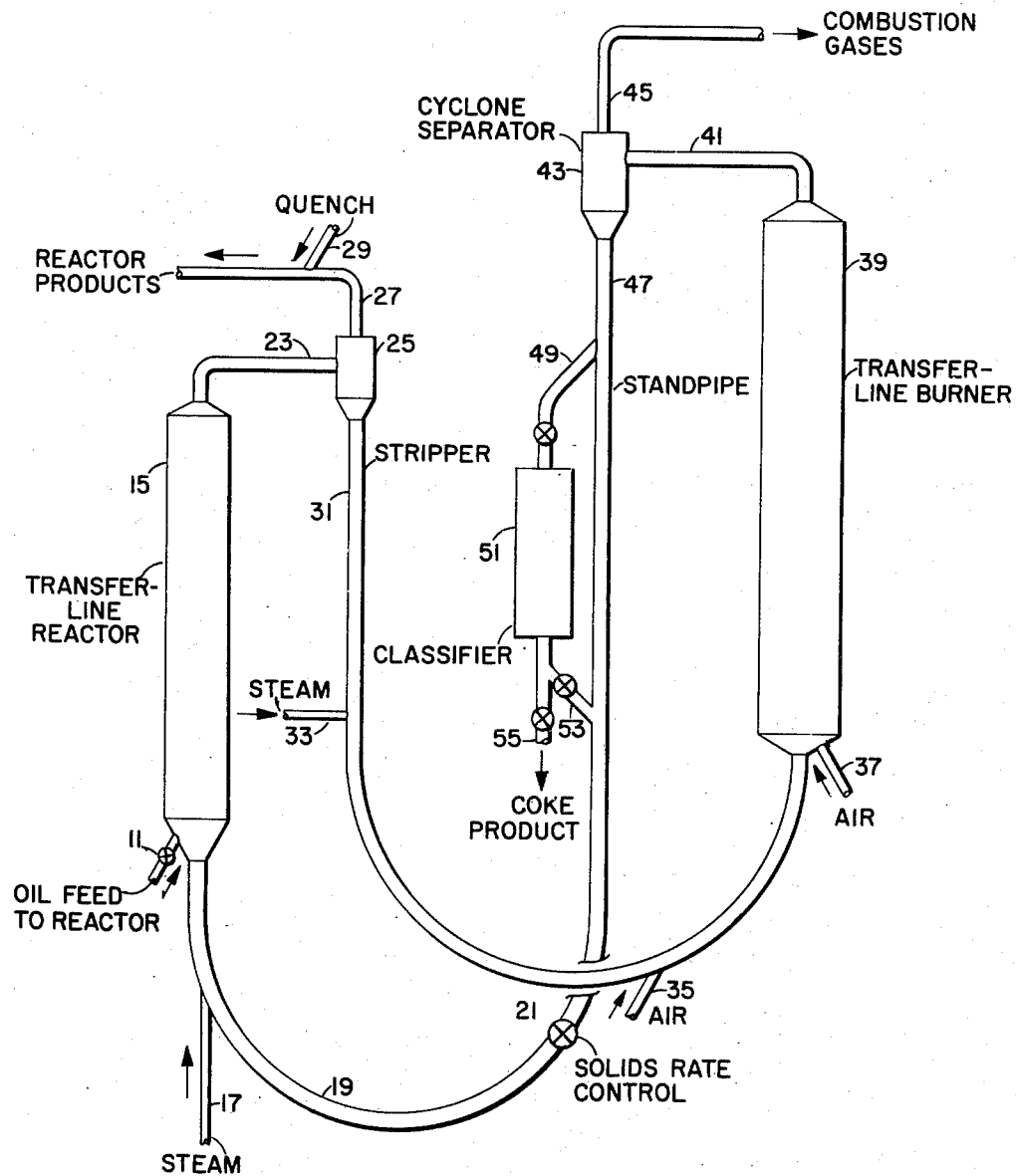

United States Patent Office 2,813,140
Patented Nov. 12, 1957

2,813,140

CONTROL OF TEMPERATURE GRADIENT IN TRANSFER LINE REACTOR

Frank G. Turpin, Baton Rouge, La., assignor to Esso Research and Engineering Company, a corporation of Delaware Application July 14, 1954, Serial No. 443,211

1 Claim. (Cl. 260—683)

The present invention relates to an improved process for the control of the temperature gradient in a transfer line reactor wherein heavy hydrocarbon oils are contacted at elevated temperatures with finely divided particulate solids suspended therein for the production of chemicals, principally gaseous unsaturated hydrocarbons and coke.

In the prior art various proposals have been made for carrying out reactions by contacting gases, vapors and liquids with particulate solids flowing in the form of a suspension in a transfer line. A particular application of this general technique relates to the coking or thermal conversion of heavy hydrocarbon oils to low molecular weight normally gaseous unsaturates and coke, generally conducted at a temperature in the range of 1100° to 1800° F.

In the coking reactions particularly, the desired conversion ordinarily is accomplished by contacting the material to be converted with a rapidly flowing stream or suspension of preheated, finely divided, non-catalytic, solid particles such as coke, sand, etc. These particles may vary in size but ordinarily they range between about 20 and 800 microns particle diameter with a consequent wide difference in actual particle size in any given sample.

The time required for reaction, the temperature, and also gradient or temperature profile is frequently quite critical for these transfer line systems.

In a given apparatus the time of contacting usually depends upon the velocity of the stream flowing through the reactor and, therefore, the control of the time of contact ordinarily can be effected by varying the velocity of the stream. In many cases, however, this is not desirable since it is preferable to continue the feed of material to be converted at a uniform rate.

Control of the temperature profile is also extremely difficult and is ordinarily effected by control of the temperature of the entering solids in conjunction with the use of added quench or cooling coils. This technique provides satisfactory control, but is expensive because in cooling the solids a considerable quantity of heat is removed from the process that must be generated in the burner vessel.

This invention provides control of reaction gradient as well as time of reaction. According to the present invention it has been discovered that he heat transfer from the particles and the temperature gradient in a transfer line reactor can be controlled by closely restricting the spread or range of particle diameter size. The effect of changing particle size of the solids stream from a wide range (80 wt. percent 150–400 microns) to a narrow range (80 wt. percent 50–150 microns) on temperature and temperature gradient is shown in Figures 1A and 1B.

Figures 1A and 1B illustrate the high temperature coking for chemicals of a South Louisiana reduced crude. The processes are conducted in the same manner except that in Figure 1A a normal particle size distribution of the coke particles is utilized, e. g.

5% >350 microns
30% 300–350 microns
30% 250–300 microns
30% 175–250 microns
5% <175 microns and in Figure 1B the particle diameter size distribution is controlled so that 75–95 wt. percent of the particles have a diameter in the range of 50 to 150 microns. The reaction time in the transfer line heater is the abscissa with the temperature as the ordinate. The entering temperature of the oil is the same in both cases as are the solid particle temperatures. It will be observed, however, that the oil is brought up to maximum temperature more quickly in Figure 1B and also recedes from this maximum temperature more rapidly to give the effect of internal quenching without the addition of an extraneous agent. The mechanism of this phenomenon is discussed in further detail below but the results are conducive to better yields, both because of the more rapidly elevated temperature and the prevention of degradation of product vapors.

Referring to the accompanying flow diagram, Figure 2, there is illustrated diagrammatically a system for accomplishing the object of this invention.

Taking as a typical example the coking of heavy residual petroleum to produce low molecular weight products such as ethylene, propylene, butadiene and other unsaturates, a stream of oil, e. g., a South Louisiana reduced crude at 650° F., to be converted, is introduced through a valve 11 into an injection nozzle which sprays the feed into a vertically extending high velocity, confined stream transfer line reactor 15 in the form of an elongated conduit. The velocity of the solids in this transfer line may be controlled further by supplemental jets of steam or of hydrocarbon gas introduced through line 17.

Hot coke solids having a narrow size distribution, i. e., 80 wt. percent in the range of 50 to 150 microns in diameter enter the reactor through U-bend 19 controlled by valve 21. The hot solids enter at a temperature of 1600° F. The oil is sprayed on the hot solids which have an inlet velocity of 5 ft./sec. The total contact time in the transfer line reactor is 0.4 second or long enough to obtain the desired reaction. Since the cracking is endothermic the slope of the temperature increase of the liquid diminishes. After about 0.1 second the maximum temperature of 1400° F. is reached. The feed is accordingly cracked and the gaseous product comprises ethylene, propylene, butadiene and other unsaturates. These materials would undesirably polymerize and consequently degrade under normal conditions without quenching.

The more rapid transfer of heat from the particles to support the endothermic heat requirements of the reaction system produces a quick cooling of the latter as illustrated in Figure 1B as contrasted to a conventional system as in Figure 1A. This produces a gradient in the transfer line recator by what is in fact internal quenching. The product degradation is consequently prevented.

The effluent of coke particles and unsaturated products leave the reactor through line 23 at a temperature of about 900° F. at a velocity of 60 ft./sec. This increase in velocity is due to the gases evolved. Solids are removed in cyclone separator 25 and gaseous product through line 27. These gaseous materials are further quenched by materials such as cycle oil, cooled solids, water, etc.

through line 29. It should be noted that this quenching does not involve the cooling of the circulating solids.

The separated solids leave the cyclone through standpipe 31 and are stripped with steam from line 33. Air or other oxygen-containing gas for fluidizing or burning enters through lines 35 and 37. The coke particles are then transported to a separate burning zone which is preferably a transfer line burner 39 although other burner systems can be utilized, e. g., fluid or moving bed. The temperature of the particles is raised by combustion to 1600° F. or higher. If desired, extraneous fuels such as natural gas or gas oil can be burned so as to supply heat and maximize coke yield. The effluent of flue gas and heated coke leaves through line 41 to cyclone separator 43. Flue gases leave the system through line 45. The coke goes through standpipe 47 and is recirculated as has been described.

In order to control the particle size within the desired range a portion of the circulating coke solids is drawn off through line 49 into classifying device 51 by elutriation or attrition, by known means, e. g. see Serial No. 375,088, filed August 19, 1953 and Serial No. 403,218, filed January 11, 1954.

The coke in the circulating system is controlled to supply the desired particle distribution, e. g., 80 wt. percent at 50 to 150 microns diameter. The controlled coke particles are returned to the system through line 53 with rejected coke discharged through line 55. It will be understood, of course, that where inerts such as shot or sand are utilized, the attrited coke can be quite fine and usually removed overhead from the classification device with the circulating solids maintained in the required range.

Heavy hydrocarbon oil feeds suitable for the process are heavy or reduced crudes, vacuum bottoms, pitch, asphalt, other heavy hydrocarbon residua or mixtures thereof. Typically, such feeds can have an initial boiling point of about 700° F., an A. P. I. gravity of about 0° to 20°, e. g., 1.9°, and a Conradson carbon residue content of about 5 to 40 wt. percent. (As to Conradson carbon residue see ASTM Test D–180–52.)

In order to express this information more fully the following conditions of operation of the various components of the described system are set forth below:

*Conditions in transfer line reactor*

|  | Broad Range | Preferred Range |
| --- | --- | --- |
| Temperature, °F | 1,100–1,800 | 1,400–1,600 |
| Superficial Velocity of Fluidizing Gas in Transfer Line Reactor, Ft./sec | 5–150 | 30–75 |
| Contact Time, Sec | 0.01–5.0 | 0.3–1.0 |

*Conditions in burner*

|  | Broad Range | Preferred Range |
| --- | --- | --- |
| Temperature, °F | 1,200–2,300 | 1,600–1,800 |
| Superficial Velocity of Fluidizing Gas, ft./sec | 0.2–150 | 50–100 |

The advantages of the process of this invention will be apparent to those skilled in the art. A means of controlling the time and the temperature of reaction is provided along with internal quenching without the necessity for wastefully cooling the circulating solids.

It is to be understood that this invention is not limited to the specific examples which have been offered merely as illustrations and that modifications may be made without departing from the spirit of the invention.

What is claimed is:

In a process of converting a heavy hydrocarbon oil to low molecular weight normally gaseous unsaturates and coke by contacting the oil at a temperature in the range of 1100° to 1800° F. in a transfer line reaction zone with a high velocity stream of coke particulate solids at a sufficiently high temperature to supply the endothermic heat requirements for the reaction, the solids contact time being in the range of 0.01 to 5 seconds, the improvement which comprises utilizing solids having a size distribution such that 75 to 95 wt. percent have a diameter in the range of 50 to 150 microns, whereby an enhanced temperature gradient and internal quenching is provided in the transfer line reaction zone; separating gaseous products from the solids, burning the coke from a portion of the solids in a separate burning zone to increase the solids temperature; separating gaseous products from the heated solids; classifying the heated solids by elutriation and returning a portion of the heated solids of the desired particle size range to the reaction zone.

References Cited in the file of this patent

UNITED STATES PATENTS

| 2,471,104 | Gohr | May 24, 1949 |
| 2,643,219 | Carr et al. | June 23, 1953 |
| 2,675,294 | Keith | Apr. 13, 1954 |
| 2,731,508 | Jahnig et al. | Jan. 17, 1956 |
| 2,737,479 | Nicholson | Mar. 6, 1956 |